Figure 1A:
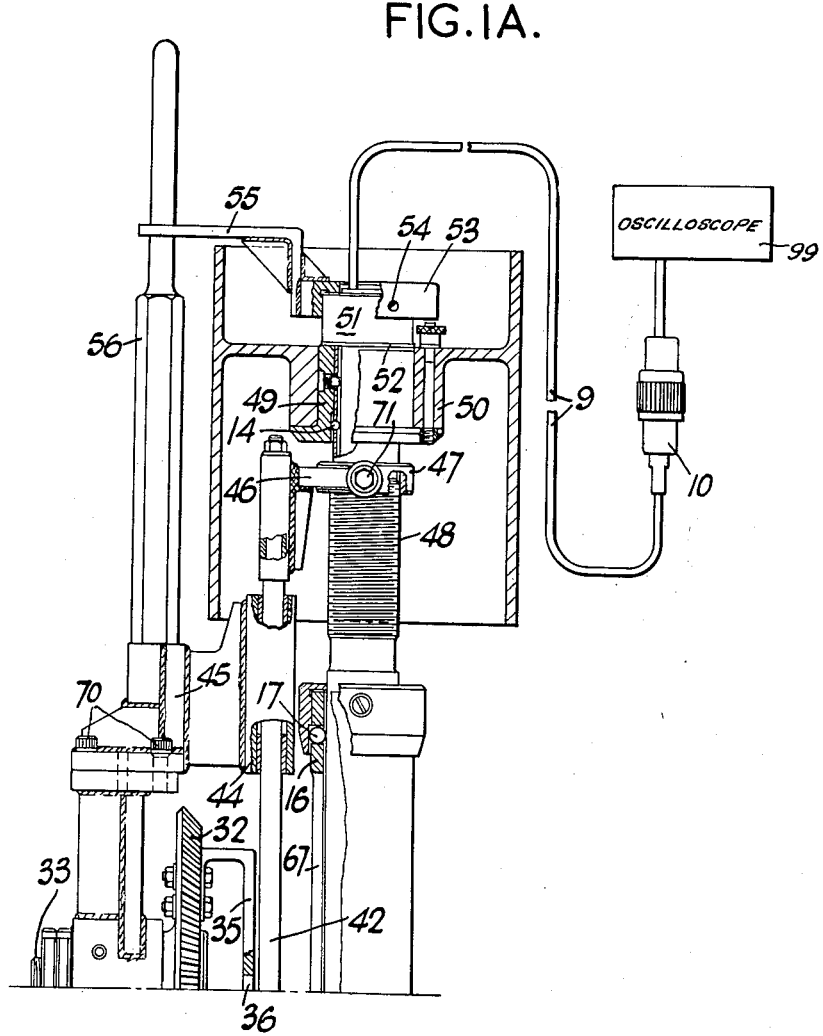

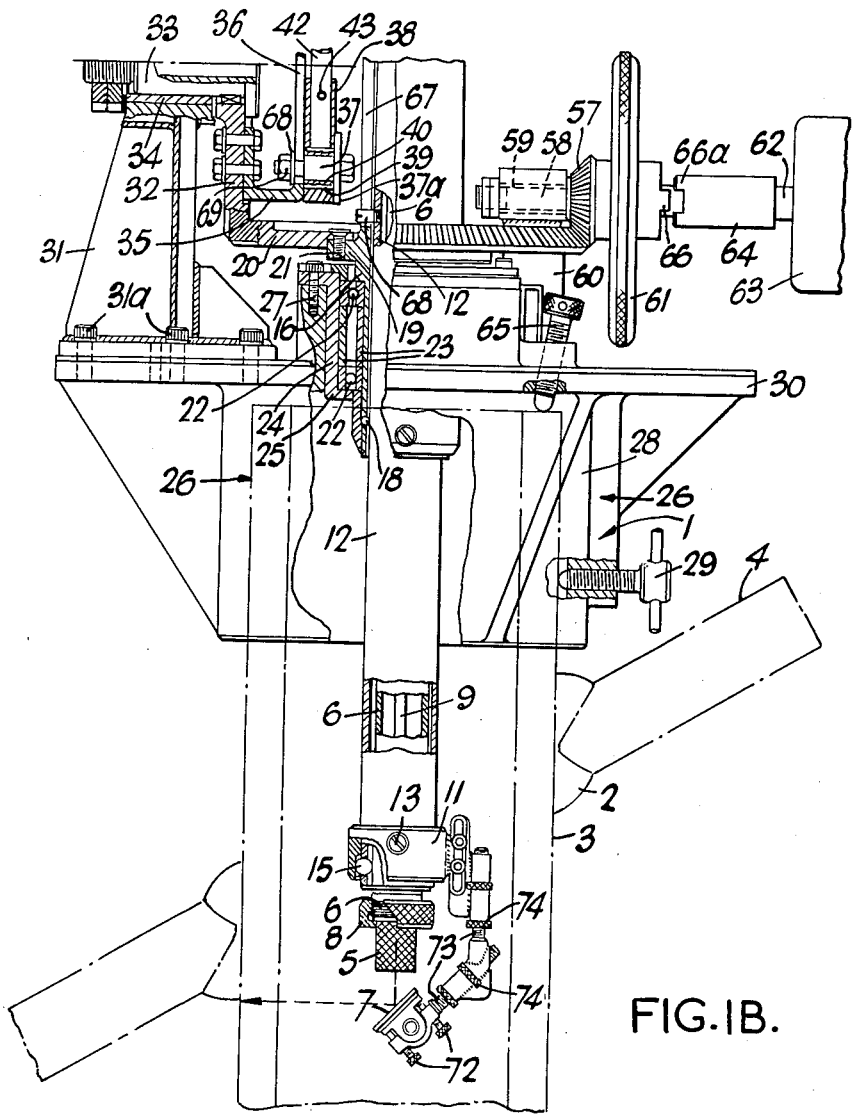
FIG.IB.

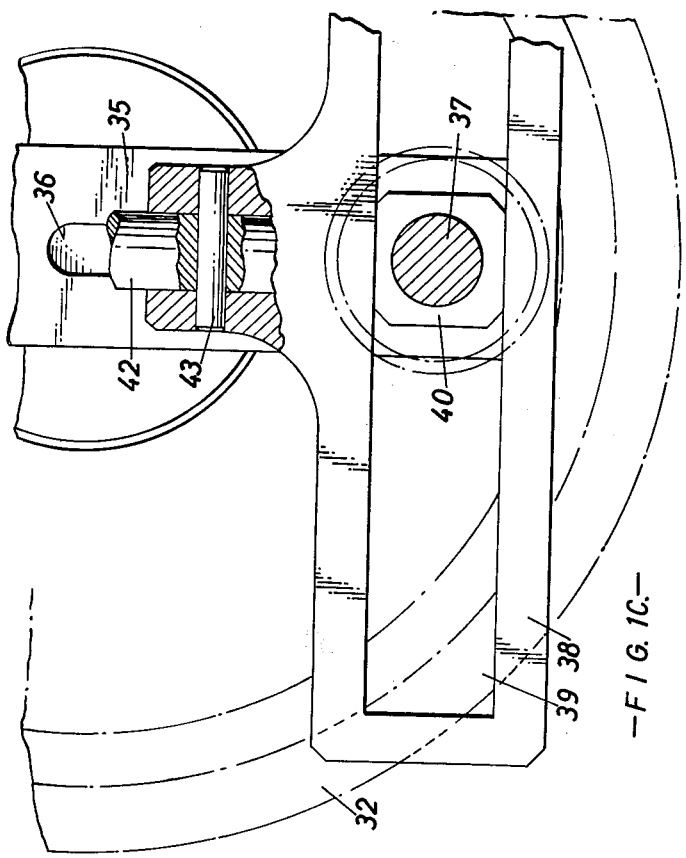

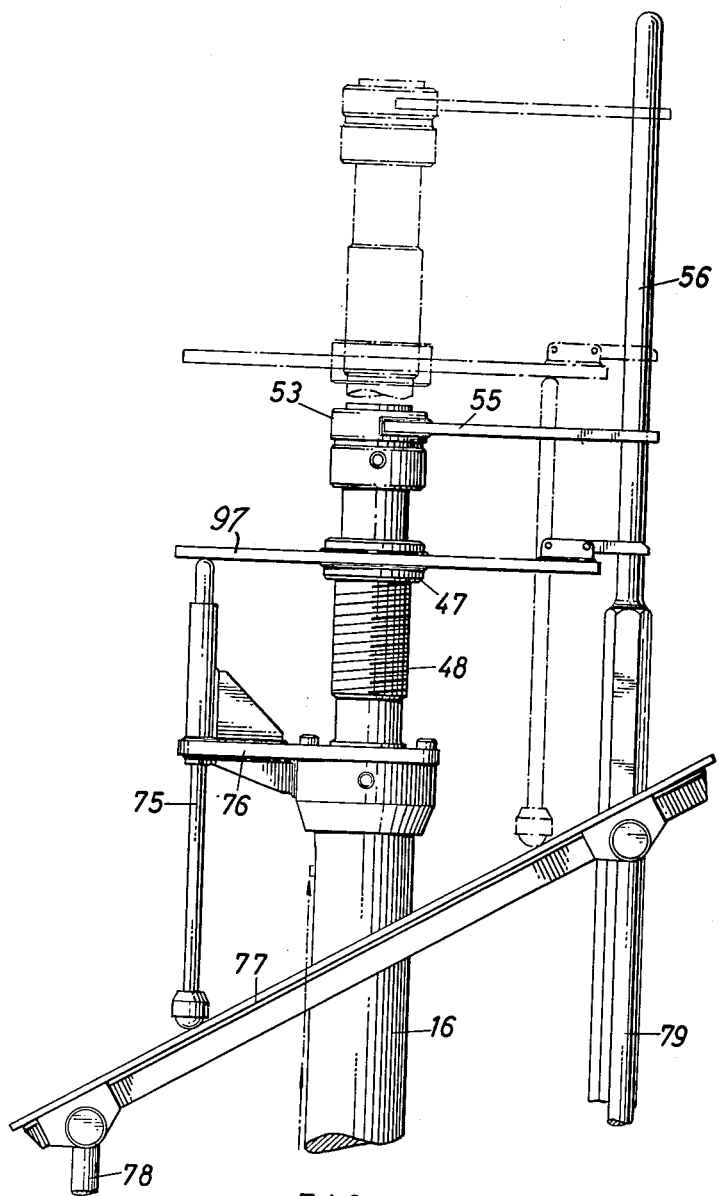

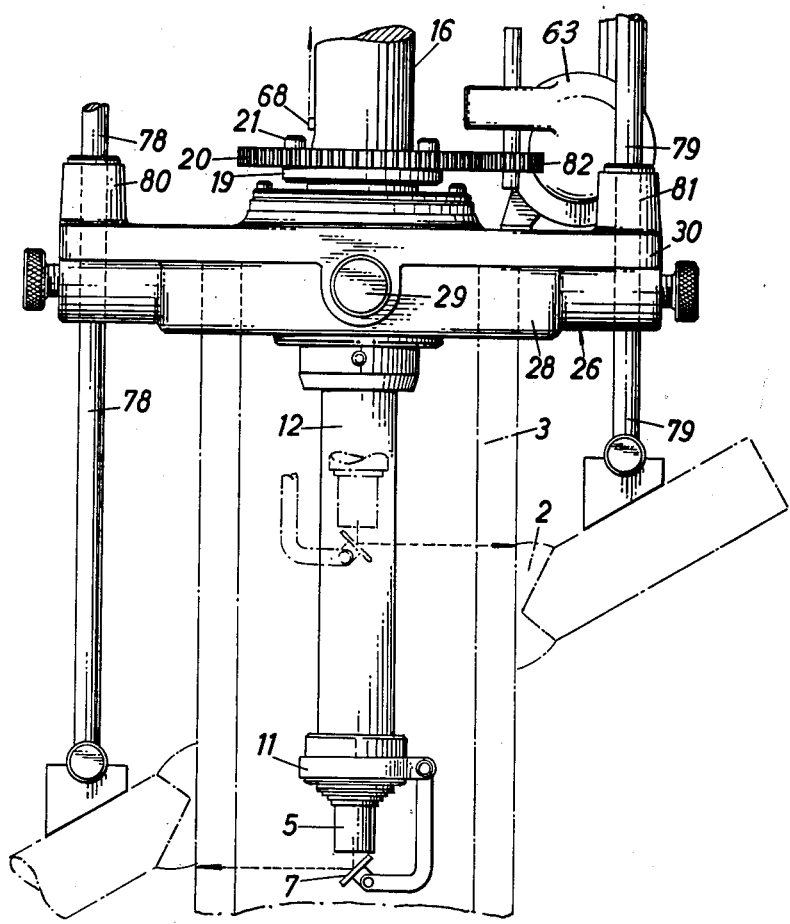
-FIG. 2B.-

United States Patent Office 3,091,959
Patented June 4, 1963

3,091,959
ULTRASONIC INSPECTION APPARATUS
Raymond Ford Hanstock and Norman Frank Godwin, Culcheth, near Warrington, Russell Frank Lumb, Chadderton, and Michael Alan Williams, Culcheth, near Warrington, England, assignors to United Kingdom Atomic Energy Authority, London, England
Filed Aug. 29, 1960, Ser. No. 52,696
Claims priority, application Great Britain Sept. 9, 1959
9 Claims. (Cl. 73—67.8)

This invention relates to ultrasonic inspection apparatus for tubular bodies and is primarily concerned with the ultrasonic inspection of weld joints of tubular bodies.

In the welding of tubular bodies the weld joint can be inspected by rotating an ultrasonic test probe inside the body, the probe being given a slow progressive axial movement as it is rotated so that the weld is, in effect, inspected in a sequence of peripheral scans.

This simple practice has not been found fully satisfactory. The main reason is that continued rotation twists unduly the cable feeding the test probe; another reason is that, for weld joints that do not lie in a plane at right angles to the axis of the body such as between stand pipes and the dome of a dome-ended cylindrical pressure vessel, the test probe, on each rotation, may pass into and out from the zone of the weld with result that the number of revolutions of the probe required to make a complete inspection of the weld is greatly increased as is also the time taken to carry out the inspection.

Accordingly, it is the prime object of the present invention to provide improved ultrasonic inspection apparatus suitable for the inspection of weld joints without incurring difficulties due to cable twist.

It is a subsidiary object to provide apparatus according to the prime object which facilitates inspection of a weld joint when the plane of the joint is oblique to the axis of the tubular body.

According to the invention, there is provided an ultrasonic inspection apparatus for weld joints of tubular bodies comprising a non-rotatable ultrasonic test probe insertable within the body, a rotatable reflector for reflecting ultrasonic signals emitted by the probe towards the weld joints of the body, and means for rotating the reflector such that the weld joint is inspected in a sequence of peripheral scans.

The apparatus may be provided with means for clamping it in position on an open end of a tubular body, a weld joint of which is to be inspected.

The means for rotating the reflector relative to the probe so as to inspect said weld joint in a sequence of peripheral scans may comprise a support for said reflector rotated by bevel gearing, the bevel gearing also driving a crank with an adjustable throw and having a connecting rod adapted to engage the reflector support and impart oscillatory movement thereto.

The said crank may comprise an adjustable eccentric mounted on a bevel wheel of said bevel gearing and whose axis is at right angles to the axis of rotation of said reflector.

The invention will now be described further by way of example with reference to the accompanying drawings wherein:

FIGURES 1A and 1B respectively combine to provide a side view, partly in section, of one embodiment of the invention, FIGURE 1C is a detail of the embodiment of FIGURES 1A and 1B.

FIGURES 2A and 2B respectively combine to provide a side view of another embodiment.

Referring to the figures, the apparatus shown in FIGS. 1A, 1B and 1C is indicated generally by the reference numeral 1 and is shown positioned for inspection of a weld joint 2 between a vertically orientated tubular stand pipe 3 and an oblique portion of a dome 4 of a dome-ended cylindrical pressure vessel.

The apparatus 1 includes a downwardly extending ultrasonic test probe 5 comprising a transducer which is adapted to transmit and receive ultrasonic signals. The probe 5 is supported centrally within the stand pipe 3 by a tube 6 and a reflector 7 for reflecting ultrasonic signals emitted by the probe 5 towards the weld joint 2, the reflector 7 being arranged to be rotated relative to the probe 5 so as to inspect the weld joint 2 in a sequence of peripheral scans as hereinafter described. Any discontinuity in the material through which the ultrasonic signals pass including the material of the weld being inspected gives rise to ultrasonic echoes which are returned to the transducer probe 5 by the reflector 7. These echoes are displayed on an oscilloscope 99. An inspection of the echoes displayed can reveal the presence of any cracks in the weld.

The probe 5 is clamped to a screw-threaded lower end of its supporting tube 6 by a screwed ring 8, a co-axial cable 9 feeding the probe being passed through the interior of the tube 6, and emerging from the upper end thereof to terminate in a plug 10 (FIG. 1A) for connecting the cable 9 to the oscilloscope 99. The reflector 7 is suspended from a collar 11 secured to a supporting tube 12 by a screw 13, the reflector being adjusted to a number of positions by means of adjusting screws 72 which adjust the angle of tilt of the reflector 7 and by two screw-threaded extensions 73 with respective locking rings 74 which provide for pre-adjustment of the axial distance between the probe 5 and reflector 7.

The two supporting tubes 6 and 12 are co-axial, spaced from one another by upper and lower ball bearings 14 and 15 respectively. The two tubes 6, 12 are housed within a further co-axial tube 16, upper and lower ball bearings 17, 18 respectively spacing the two tubes 12, 16. The tube 16 has a longitudinal slot 67 within which is located a pin 68 screwed into the walls of the co-axial tube 12. The tube 16 has an external flanged section 19 for supporting a bevel wheel 20, which is secured to the section 19 by means of screws 21. The tube 16 is located centrally within the stand pipe 3 by a pair of ball races 22 spaced from one another by a pair of co-axial spacer tubes 23, the races 22 and spacer tubes 23 being carried within a recess 24 of a bearing housing 25 which is secured to a base member 26 by screws 27.

The base member 26 comprises a tubular part 28 and a plate part 30, the internal diameter of the tubular part 28 being slightly greater than the external diameter of the stand pipe 3 so that the former may be supported by the latter when clamped thereto by clamping screws 29, as shown. The plate part 30 carries adjusting screws 65 the lower ends of which bear upon the upper end of the stand pipe 3 so that by suitable adjustment (prior to tightening of the clamping screws 29) the co-axial tubes 6, 12 and 16 respectively may be accurately aligned with the axis of the stand pipe 3. The plate part 30 supports a bracket 31, secured thereto by screws 31a, the bracket 31 carrying a bevel wheel 32 mounted on a shaft 33 journalled in a bushing 34. The teeth of the bevel wheels 20, 32 engage with one another, the respective axes of the two wheels being at right angles to one another as shown. The bevel wheel 32 carries a strap member 35 having a slot 36 for locating, with clearance, a yoke pin 37. As will be seen more clearly in FIGURE 1C, which is a view from the right hand side of FIGURE 1B of the assembly adjoining the strap 35, a yoke 38 has a slot 39 within which is located, with clearance, a block 40 drilled to accommodate the yoke pin 37. The yoke pin 37 has an enlarged head 37a to prevent the block 40 from moving out of the slot 39 of the yoke 38 and a washer 68 and nut 69 prevents the yoke pin 37 itself from moving out of the slot 36 of the strap 35. The upper portion of the yoke 38 is drilled to accommodate the lower end of a connecting rod 42, the rod 42 and yoke 37 being pinned together by a pin 43. The connecting rod 42 is constrained to vertical movement by a vertically orientated bushing 44 carried on an extension 45 attached to the bracket 31 by screws 70. The rod 42 carries on its upper end a fork member 46 having a pair of diametrically opposed pinching screws 71 for locating an internally screw-threaded ring 47 which acts as a carrier for the probe and reflector assembly and the screw-threads of which engage with the screw-threads of an externally screw-threaded portion 48 near the upper end of the tube 12.

The extreme upper end of the tube 12 carries an annular member 49, the lower end of which provides a support for a drum 50, the drum 50 being adapted to carry a chart for recording purposes. The upper end of the annular member 49 provides support for a head 51 attached to the upper end of the tube 6, the head 51 being spaced from the upper end of the annular member 49 by height-adjusting shims 52. A collar 53 is attached to the upper end of the head 51 by a screw 54 and carries a fork-member 55, the prongs of which locate the upper side faces of a constraining pillar 56 carried on the extension 45 of the bracket 31.

The bevel wheel 20 is rotated by a pinion 57 mounted midway along a shaft 58, one end of which is journalled in a bushing 59 carried by a bracket 60 on the plate part 30 of the base member 26. The other end of the shaft 58 carries a wheel 61, the shaft 58 being rotated by hand rotation of the wheel 61 or by the shaft 62 of an electric motor 63 by way of a dog clutch 64 slidably mounted on the shaft 62 and having teeth 66a for engagement with teeth 66 on the central portion of the wheel 61.

In operation the stand pipe 3 is filled with a liquid couplant, such as water, and the probe 5 made to emit ultrasonic signals along the axis of the stand pipe 3 to be reflected by the reflector 7 towards the weld joint 2. The shaft 58 is rotated either by the wheel 61 or the electric motor 63, to rotate the pinion 57 and thus in turn the bevel wheels 20 and 32. Rotation of the bevel wheel 20 results in a corresponding rotation of the tube 16, and hence, because of the pin 68, the tube 12 and the reflector 7 supported therefrom. Any tendency of the tube 6 to rotate also, due to the friction of the ball bearings 14, 15 between the co-axial tubes 6, 12 is prevented by the pillar 56 restraining the fork-member 55 attached to the head 51 on the upper end of the tube 6.

Rotation of the bevel wheel 32 causes the yoke pin 37 to follow a circular path thereby imparting a vertical oscillatory movement to the yoke 38 and the connecting rod 42. This oscillatory movement of the rod 42 and hence the screwed ring 47 carried thereby is transmitted to the tube 12 (and thus the tube 6) so that, not only the tube 12 and the reflector 7 it supports are rotated, but are also moved at the same time in the course of each revolution through a cycle of upwards and downwards displacement so as to follow the inclination of the weld joint 2. A spiral upward feed motion is superimposed by the screw ring of the screw-threaded portion 48 through the ring 47 so that the assembly of probe and reflector ascends gradually and the weld joint is inspected in a sequence of peripheral scans. In effect, the reflector 7 moves through a helical path, the angle of which is dependent on the eccentric throw of the yoke pin 37, and which is preferably adjusted so as to be the same angle as the plane in which the weld joint 2 is orientated. Adjustment of eccentricity is effected by loosening of the pinch bolts 71 on the fork-member 46 so as to free the screwed ring 47, moving the yoke 38 vertically up or down until the center of the yoke pin 37 is the required distance from the center of the bevel wheel 32, then rotating the ring 47 so that it moves axially along the screw-threaded portion 48 of the tube 12 until again aligned with the fork-member 46 when the pinch bolts 71 are re-tightened.

During operation of the apparatus, the drum 50 may carry a suitable chart, and suitable recording apparatus is employed to provide a record of the responses to ultrasonic signals received by the oscilloscope. The distance between the reflector 7 and the weld joint 2 is kept constant at all times, thus preventing confusion in response signals received by the oscilloscope.

In the further embodiment illustrated in FIGURES 2A and 2B where corresponding components are denoted by the same reference numerals, the tube 12, and hence the probe and reflector assembly, is moved through the cycles of upwards and downwards displacement by means of a follower 75 which is guided slidably for vertical movement in a bracket 76 projecting laterally from the tube 16 and which engages at its upper end with the underside of an arm 97 projecting laterally from the screwed ring 47 and at its lower end with the upper surface of a plate 77. Pivotally attached at diametrically opposed points to the underside of this plate 77 are legs 78 and 79 of equal length which are guided slidably and parallel to one another through bosses 80 and 81 on the plate part 30 of the base member 26. The lower ends of these legs have pedestals engageable on the pressure vessel dome 4 so that the plate 77 is self-aligning with the inclination of the weld joint 2.

The toothed wheel 20 fixed to the tube 16 is a spur gear driven by the electric motor 63 through a spur gear 82. As in the previous embodiment, rotation of the tube 16 by the motor is imparted to the tube 12 through the pin 58 whilst the tube 6 is restrained from rotating by the fork member 55 cooperating with the pillar 56. The follower 75 is caused to ride over the plate 77 by rotation of the bracket 76 with the tube 16, and therefore the probe and reflector assembly is raised and lowered by the follower at each revolution so as to scan at the inclination of the weld joint.

It is to be understood that the present invention is not restricted to the specific embodiments disclosed inasmuch as many modifications may be conceived by those skilled in the art. Thus, axial feed motion might be imparted to the reflector by cams or other well-known means of converting rotary movement into linear movement. It is therefore the purpose of the appended claims to cover all such changes and modifications as fall within the true spirit and scope of the invention.

We claim:

1. An ultrasonic inspection apparatus for weld joints of tubular bodies and comprising an ultrasonic test probe insertable within the tubular body, means restraining said probe against rotation, a reflector for reflecting ultrasonic signals emitted by said probe in a generally radial direction, means for rotating said reflector relative to said probe, means for imparting a feed motion to said reflector in the axial direction of said probe whereby to enable the weld joints to be inspected in a sequence of peripheral scans and indicator means to display ultrasonic echoes of said signals returned from the weld joints and reflected by the reflector onto the probe.

2. An ultrasonic inspection apparatus for weld joints of tubular bodies and comprising a base member adapted to be held in fixed relationship with the tubular body, an assembly including an ultrasonic test probe and a reflector for reflecting ultrasonic signals emitted by said probe in a generally radial direction which assembly is carried by said base member for insertion into the tubular body, means restraining said probe against rotation relative to said base member, means for rotating said reflector relative to said probe, means for imparting a feed motion to said assembly in the axial direction of said base member whereby to enable the weld joints to be inspected in a sequence of peripheral scans and indicator means to display ultrasonic echoes of said signals returned from the weld joints and reflected by the reflector onto the probe.

3. For the inspection of weld joints of tubular bodies where a joint lies oblique to the plane perpendicular to the body axis, an ultrasonic inspection apparatus comprising a non-rotatable ultrasonic test probe insertable within the tubular body, a rotatable reflector for reflecting ultrasonic signals emitted by said probe in a generally radial direction, means constraining rotation of said reflector to scan with the reflected ultrasonic signals along a path oblique to the plane perpendicular to the body axis and indicator means to display ultrasonic echoes of said signals returned from the weld joints and reflected by the reflector onto the probe.

4. For the inspection of weld joints of tubular bodies where a joint lies oblique to the plane perpendicular to the body axis, an ultrasonic inspection apparatus comprising a base member adapted to be held in fixed relationship with the tubular body, an assembly including an ultrasonic test probe and a reflector for reflecting ultrasonic signals emitted by said probe in a generally radial direction which assembly is carried by said base member, means restraining said probe against rotation relative to said base member, means for rotating said reflector relative to said probe, means for moving said assembly through a cycle of displacemetn in the axial direction of said base member in the course of each revolution of said reflector and indicator means to display ultrasonic echoes of said signals returned from the weld joints and reflected by the reflector onto the probe.

5. An apparatus as set forth in claim 4, wherein said assembly is carried by a carrier means which is oscillatable through said cycle of displacement and means is provided to impart a feed motion to said assembly relative to said carrier means in the axial direction of said base member.

6. An apparatus as set forth in claim 5, and further comprising an elongated member supporting said reflector and having screw-threaded engagement with said carrier means, and means restraining said carrier means against rotation relative to said base member.

7. An ultrasonic inspection apparatus for weld joints of tubular bodies and comprising a base member adapted to be held in fixed relationship with the tubular body, an assembly including an ultrasonic test probe and a reflector for reflecting ultrasonic signals emitted by said probe in a generally radial direction, carrier means carrying said assembly and supported non-rotatably on said base member, drive transmission means for imparting to said reflector rotary movement relative to said probe, means coupled with said drive transmission means for translating rotary movement of said reflector into a cycle of displacement of said carrier means in the axial direction of said base member and indicator means to display ultrasonic echoes of said signals returned from the weld joints and reflected by the reflector onto the probe.

8. An apparatus as set forth in claim 7 having bevel gearing as said drive transmission means, a crank with adjustable throw driven by said gearing, and a connecting rod connected at one end to said crank and at the other end to said carrier means.

9. An ultrasonic inspection apparatus for weld joints of tubular bodies and comprising a base member adapted to be held in fixed relationship with the tubular body, an assembly including an ultrasonic test probe and a reflector for reflecting ultrasonic signals emitted by said probe in a generally radial direction, carrier means carrying said assembly and supported non-rotatably on said base member, a plate tiltable adjustably relative to said member so as to assume the inclination of a weld joint on the tubular body, means for rotating said reflector relative to said probe, means in following engagement with said plate to impart to said assembly a cycle of displacement in the axial direction of said base member for each revolution of said reflector and indicator means to display ultrasonic echoes of said signals returned from the weld joints and reflected by the reflector onto the probe.

References Cited in the file of this patent

UNITED STATES PATENTS

| | | |
|---|---|---|
| 2,545,309 | Roberts | Mar. 13, 1951 |
| 2,908,161 | Bincer | Oct. 13, 1959 |
| 2,921,126 | Street et al. | Jan. 12, 1960 |
| 2,940,305 | Williams et al. | June 14, 1960 |
| 2,971,372 | Lewis et al. | Feb. 14, 1961 |